United States Patent [19]

Kozono et al.

[11] Patent Number: 5,459,618
[45] Date of Patent: Oct. 17, 1995

[54] APPARATUS FOR PRODUCING A VIDEO SIGNAL REPRESENTING AN ANIMATION

[75] Inventors: Haruo Kozono, Tokyo; Keiichi Watanabe, Chiba; Yasuhiro Aikawa, Tokyo, all of Japan

[73] Assignee: Sony Corporation, Tokyo, Japan

[21] Appl. No.: 85,927

[22] Filed: Jul. 6, 1993

[30] Foreign Application Priority Data

Jul. 10, 1992 [JP] Japan .................................. 4-207109

[51] Int. Cl.⁶ .................................................. G11B 27/36
[52] U.S. Cl. ......................... 360/31; 360/72.2; 360/35.1
[58] Field of Search ............................ 360/14.3, 35.1, 360/31, 14.1–14.2, 13, 32, 72.1, 72.2, 53; 358/311, 310, 335; 395/425; 348/715, 584

[56] References Cited

U.S. PATENT DOCUMENTS

| | | | |
|---|---|---|---|
| 4,357,624 | 11/1982 | Greenberg | 358/311 X |
| 4,507,691 | 3/1985 | Ishiguro et al. | 360/14.3 |
| 4,698,664 | 10/1987 | Nichols et al. | 360/14.3 X |
| 4,887,171 | 12/1989 | Rose | 360/31 |
| 4,979,129 | 12/1990 | Okubu et al. | 364/518 |
| 5,267,100 | 11/1993 | Ichijo et al. | 360/31 X |
| 5,274,463 | 12/1993 | Matsumoto et al. | 360/14.3 X |

FOREIGN PATENT DOCUMENTS

| | | |
|---|---|---|
| 58 179075 | 10/1983 | Japan . |
| 03276470 | 12/1991 | Japan . |
| 04172496 | 6/1992 | Japan . |

*Primary Examiner*—Andrew L. Sniezek
*Attorney, Agent, or Firm*—William S. Frommer; Alvin Sinderbrand

[57] ABSTRACT

A picture processing apparatus for producing animations etc., which successively records still pictures formed to a computer by a video tape recorder, and enables animations to be produced with simple operation. After the picture data of a predetermined number of frames is stored to a picture data storing device, the operation is switched. The picture data which is stored in the picture data storing device, is converted into a video signal to be recorded to a magnetic tape, and by repeating these operations, animations are produced.

9 Claims, 4 Drawing Sheets

APPARATUS FOR PRODUCING A VIDEO SIGNAL REPRESENTING AN ANIMATION

BACKGROUND OF THE INVENTION

1. Field of the Invention

This invention relates to a picture processing apparatus, and more particularly, is suitable for the production of animations or the like, by successively recording still pictures formed by a computer to a video tape recorder.

2. Description of the Related Art

An animation producing apparatus has been disclosed, for example, in Japanese Patent Application No. 156573/1991, in which animations are produced by interpolation.

Conventionally, picture processing apparatuses produce still pictures by, for example, a graphic work station etc., which are recorded successively by a video tape recorder, and therefore animations can be produced with high efficiency compared with handwriting (i.e., by hand).

An example of a picture processing apparatus is shown in FIG. 1. By operating a keyboard 2 and a mouse 4, still pictures constituting animations are formed frame by frame by using a graphic computer 6 exclusively used for forming pictures.

This still picture is supplied to a video tape recorder 10 in the form of a video signal via a distributor 8, when each frame is formed.

The video tape recorder 10 assembly-records the still pictures formed by the graphic computer 6 frame by frame, by rewinding the magnetic tape to search the head portion of them.

At this time, the operator operates the video tape recorder 10 and the graphics computer 6 while monitoring the output signal of the distributor 8 via the monitor 12, so as to assembly-record still pictures frame by frame by repeating the process of rewinding and searching the head portion of them with the video tape recorder 10.

Another example of a picture processing apparatus 20 is shown in FIG. 2, which uses a frame recorder 18 to record still pictures formed by the graphic computer 6, the still pictures being supplied to the frame recorder 18 in the form of picture data.

The frame recorder 18 can store dozens of frames of such picture data, and the stored picture data is converted into a video signal and is output in accordance with control data outputted from an editor 22.

When outputting this video signal, the frame recorder 18 outputs the video signal in synchronization with the video tape recorder 10 via a sync generator 24. The editor 22 successively outputs the video signal to the video tape recorder 10.

Thereby, the operator operates the graphic computer 6 and the editor 22 while monitoring the display picture of the monitor 26 in order to assembly-record dozens of frames of the video signal. This process is repeated so that animations can be produced.

In the picture processing apparatus 20, the picture data is stored in the frame recorder 18, and then the stored picture data can be recorded by the video tape recorder 10 by operating the editor 22. Therefore, the whole operation can be simplified compared with assembly-recording frame by frame.

During assembly-recording by the video tape recorder, there are the necessary processes (i.e., operations) of pre-roll (e.g., rewinding) and post-roll (e.g., forwarding) of the recording medium. It takes about thirty seconds to complete pre-roll and post-roll due to the inertia of the magnetic tape system.

That is, in assembly-recording frame by frame, it takes about thirty seconds to record 1/30 second, that is, to record one frame, thus it is characterized by a very poor efficiency of producing animations.

Further, the picture processing apparatus 20 can lighten the burden imposed on the magnetic tape compared with the case where assembly-recording is performed frame by frame. Further, the frequency of the generation of troubles (i.e., failures), such as troubles of the magnetic tape system, can also be reduced.

However, even when producing animations by using a frame recorder 18, the operator has to operate the graphic computer 6 and the editor 22.

Therefore, when using the frame recorder 18, there is a problem that it is necessary to allot an exclusive operator to the graphic computer 6 and the editor 22, and that the troublesome operations must be repeated.

Among these problems, in the graphic computer, the forming time per frame can be shortened by using a computer with a high operation processing speed. Further, with respect to continuous still pictures, it is also considered that they be formed automatically.

However, when recording to the video tape recorder, it depends on the operator's operation after all. Therefore, it takes time to produce the whole animation, even if the forming time per frame is shortened and the still pictures are formed automatically. Further, the operator must repeat the above described troublesome operations.

As one method for solving this problem, it has been considered to record the picture data by using an optical magnetic disc apparatus, for example, instead of the video tape recorder. However, in such a disc type recording apparatus, the recording time is short compared with the video tape recorder, and the picture quality of the reproduced picture is deteriorated, and variable speed reproduction is difficult, and thus there is a problem of being insufficient for practical use.

SUMMARY OF THE INVENTION

In view of the foregoing, an object of this invention is to provide a picture processing apparatus which can produce animations by a simple operation.

The foregoing object and other objects of this invention have been achieved by the provision of a picture processing apparatus of the first invention wherein: a picture data generating means 32 for successively generating picture data D1 frame by frame and outputting it; a picture data storing means 38 for successively storing the picture data D1 while in a picture data storing mode, and for converting the stored picture data D1 into a video signal SV2 to output it while in a video signal recording mode; a video tape recorder 40 for recording the video signal SV2 to a magnetic tape while in the video signal recording mode; control means 32 and 40 for controlling the operations of the picture data generating means 32, the picture data storing means 38, and the video tape recorder 40. The control means 32 and 40 stores the picture data D1 to the picture data storing means 38 by the predetermined number of frames in the picture data storing mode, and then the operation mode is switched to the video signal recording mode. In the video signal recording mode, the picture data D1 which is stored to the picture data storing means 38, is converted into a video signal SV2 to be recorded to the magnetic tape, after that, the operation mode is switched to the picture data storing mode.

In a picture processing apparatus of the second invention, the control means 32 and 40 are formed of the first control means 32 for controlling the picture data generating means 32 and the second control means 40 for controlling the video tape recorder 40. The first control means 32 controls the picture data storing means 38 and the picture data generating means 32 to store the picture data D1 to the picture data storing means 38 by the predetermined number of frames and then outputs the first mode switching signal to the second control means 40. When the second mode switching signal is outputted from the second control means 40, it controls the picture data storing means 38 and the picture data generating means 32 to store the picture data D1 to the picture data storing means 38. The second control means 40 is switched to the video signal recording mode corresponding to the first mode switching signal, and controls the picture data storing means 38 and the video tape recorder 40 to record the video signal SV2, and upon the completion of the recording of the video signal SV2, outputs the second mode switching signal.

In a picture processing apparatus of the third invention, the second control means 40 controls the video tape recorder 40 and the picture data storing means 38 corresponding to the time data recorded previously to the magnetic tape, so that the video signal SV2 outputted from the picture data storing means 38 is assembly-recorded to the magnetic tape.

In the picture data storing mode, the picture data D1 is stored to the picture data storing means 38 by the predetermined number of frames, and then the operation mode is switched to the video signal recording mode. The picture data D1 which is stored to the picture data storing means 38, is converted into the video signal SV2 to be recorded to the magnetic tape in the video signal recording mode. At this time, the operation mode is switched to the picture data storing mode. Thereby, the animations etc. can be produced successively, by automatically repeating the picture data storing mode and the video signal recording mode.

Further, the control means 32 and 40 are composed of the first control means 32 of the side of the picture data generating means 32 and the second control means 40 of the side of the video tape recorder 40, to switch the operation mode. Therefore, the master control means of the picture data storing means is switched with each operation mode to switch the whole operation.

At this time, by controlling the video tape recorder 40 and the picture data storing means 38 corresponding to the time data recorded previously to the magnetic tape, the video signal SV2 outputted from the picture data storing means 38 can be assembly recorded certainly.

With this invention, a picture processing apparatus can be obtained wherein, the predetermined number of frames of picture data are stored to picture data storing means, and then the operation is switched to convert the picture data stored in the picture data storing means into a video signal, so as to have them recorded to a magnetic tape. Therefore, animations etc., can be produced automatically by repeating these operations, thus, animations can be produced with simple operation.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings:

(1) Construction of the Embodiment

Figure 1:
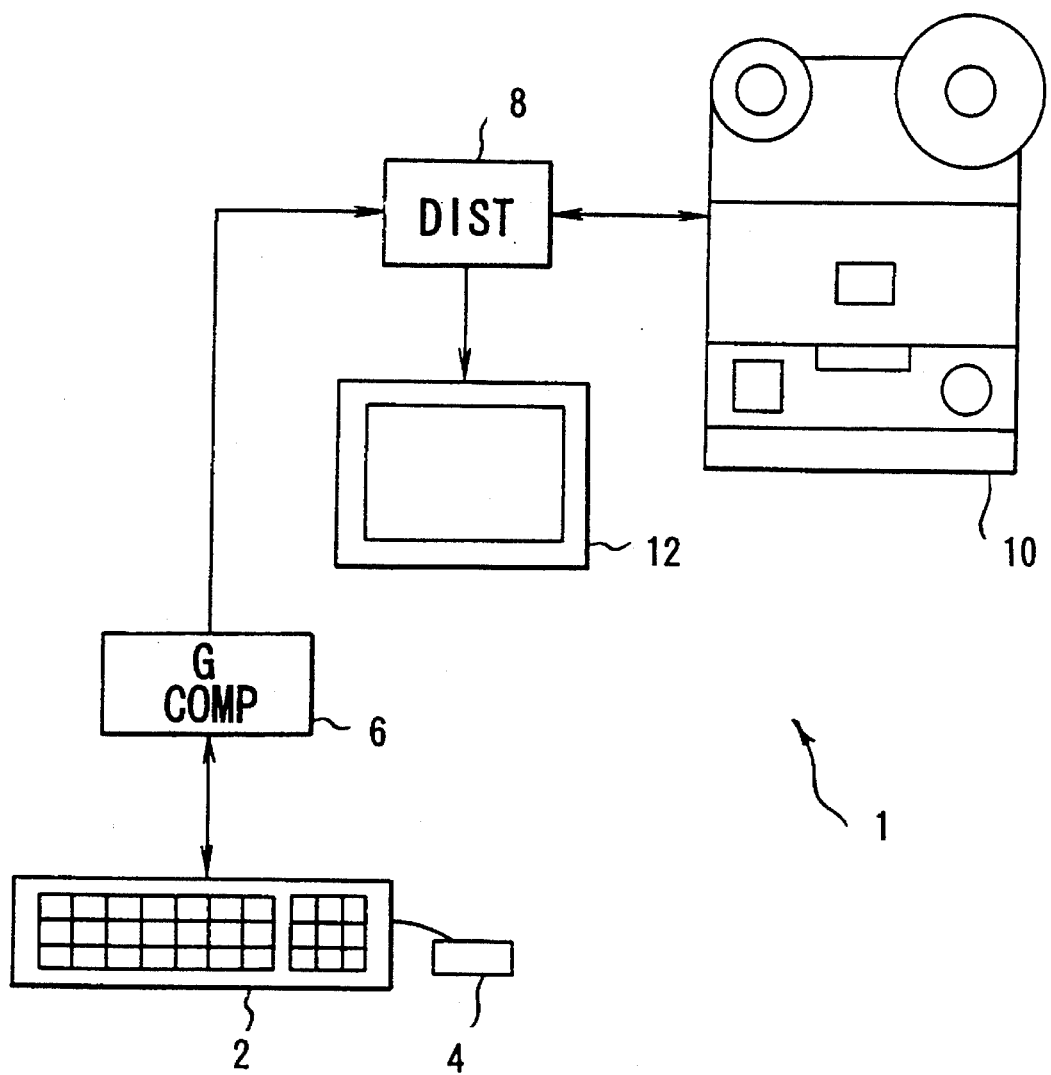
FIG. 1 is a block diagram showing a conventional picture processing apparatus.
Figure 2:
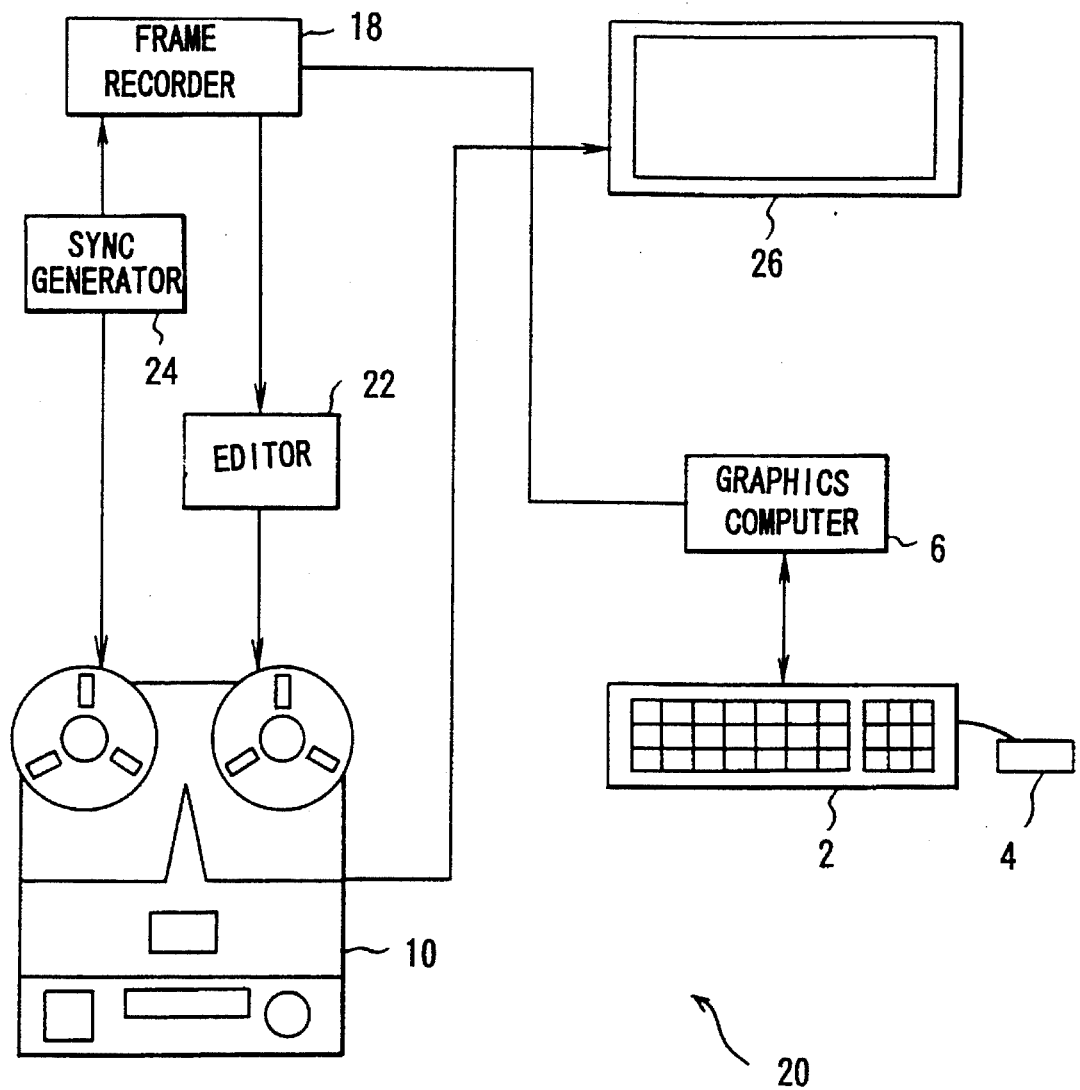
FIG. 2 is a block diagram showing a conventional picture processing apparatus using a frame recorder.
Figure 3:
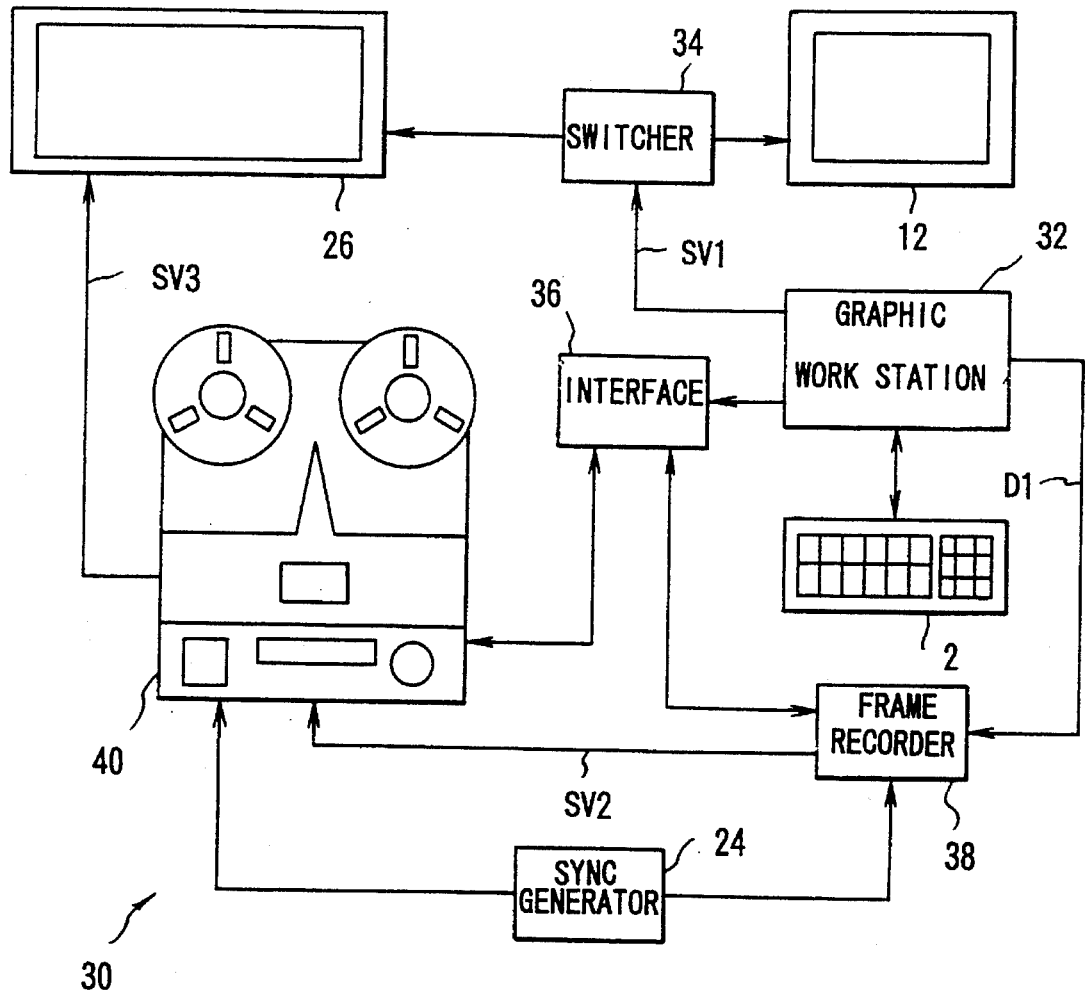
FIG. 3 is a block diagram showing an embodiment of the animation producing apparatus of this invention.

In FIG. 3, which shows the corresponding portions of FIG. 2 with the same numerals, numeral 30 represents the animation producing apparatus of the present invention, in which a graphic work station 32 forms still pictures and controls the entire operation to be described.

In the graphic work station 32, a predetermined picture forming processing program is executed corresponding to the input of a keyboard 2, and then a picture data D1 formed by graphic work station 32 is converted into a video signal SV1 before supplying it to a switcher 34.

Switcher 34 outputs video signal SV1 to a monitor of high quality television system 26 or a monitor of standard television system 12. Therefore, desired animations can be produced by an operator who also monitors the display screens of the monitors 26 and 12.

Upon the completion of one still picture, graphic work station 32 supplies a control signal to a frame recorder 38 via an interface 36 to control the operation of the frame recorder 38, at which point, the picture data D1 of this still picture (in this case, one still picture is composed of the picture data D1 of 1920×1035 pixels) is stored in the frame recorder 38.

The graphic work station 32 and the frame recorder 38 repeat the forming and storing of still pictures process for a predetermined number of times before the graphic work station 32 supplies a control signal to the video tape recorder 40 via the interface 36, so as to cause the video tape recorder 40 to begin operating (to be described).

Further, once the video tape recorder 40 executes the predetermined process (to be described) in response to the above-mentioned control signal, and after a control signal signaling the completion of the predetermined process is supplied, the forming and storing process of a still picture is repeated again for the predetermined number of times.

Therefore, the graphic work station 32, while supplying the predetermined number of still pictures to the frame recorder 38, acts as the master controller of the frame recorder 38, so that after producing the animation by the number of frames set previously, the whole operation is controlled to stop.

In the meantime, the video tape recorder 40 begins operating (i.e. recording) in response to the control signal supplied from the graphic work station 32, so that the still pictures stored in the frame recorder 38 are recorded on the magnetic tape in the video tape recorder 40.

The video tape recorder 40, while the control signal is submitted, completes the recording of the still pictures stored in the frame recorder 38. The operation of the frame recorder 38 is controlled in order to successively record the still pictures stored in the frame recorder 38 to the magnetic tape.

Further, the video tape recorder 40 previously records a blank frame to the magnetic tape with a time code signal, and then assembly-records the still pictures of the frame recorder 38 in accordance with this time code signal.

That is, the video tape recorder 40 and the frame recorder 38 operate in synchronization with each other, corresponding to the time code signal outputted from the sync generator 24. The video tape recorder 40, when it receives a control signal, rewinds the magnetic tape by the number of frames set previously (that is, pre-roll).

The video tape recorder 40 subsequently begins reproducing at which point it is controlled by the time code signal supplied from sync generator 24, so as to lock the operation of the time code signal of the sync generator 24.

The time code signal reproduced from the magnetic tape is monitored, and when it reaches the starting point of assembly-recording, the video tape recorder 40 is switched to the recording mode.

The video tape recorder 40 simultaneously supplies the control signal to the frame recorder 38 via the interface 36 to set the frame recorder 38 to an operating state. The frame recorder 38 thereby converts the stored picture data D1 into the video signal SV2 and supplies it as an output.

The video tape recorder 40, after operating as the master controller of the frame recorder 38, is switched to the reproducing mode, at which point this operation is complete, and a control signal indicating the completion of this operation is supplied to the graphics work station 32.

Upon completion of the recording operation, the video tape recorder 40, reproduces status data that was recorded with the video signal to confirm whether the video signal was accurately recorded. If the video signal was not accurately recorded, the magnetic tape is pre-rolled (i.e. rewound) in order to record the video signal again.

The recording process is then repeated corresponding to the control signal supplied from the graphics work station 32, so that animations can be assembly-recorded successively to the magnetic tape for each predetermined number of frames.

The frame recorder 38 utilized with the graphics work station 32 and the video tape recorder 40 successively stores the picture data D1 produced by the graphic work station 32. The frame recorder 38 can store thirty-two still pictures.

After the video tape recorder 40 begins operating (discussed above), the frame recorder 38 is controlled by the video tape recorder 40 to convert the stored picture data D1 to a video signal SV2 and supply the video signal SV2 in the form of color signals in synchronization with the time code signal of the sync generator 24.

(2) Operation of the Embodiment

Figure 4:
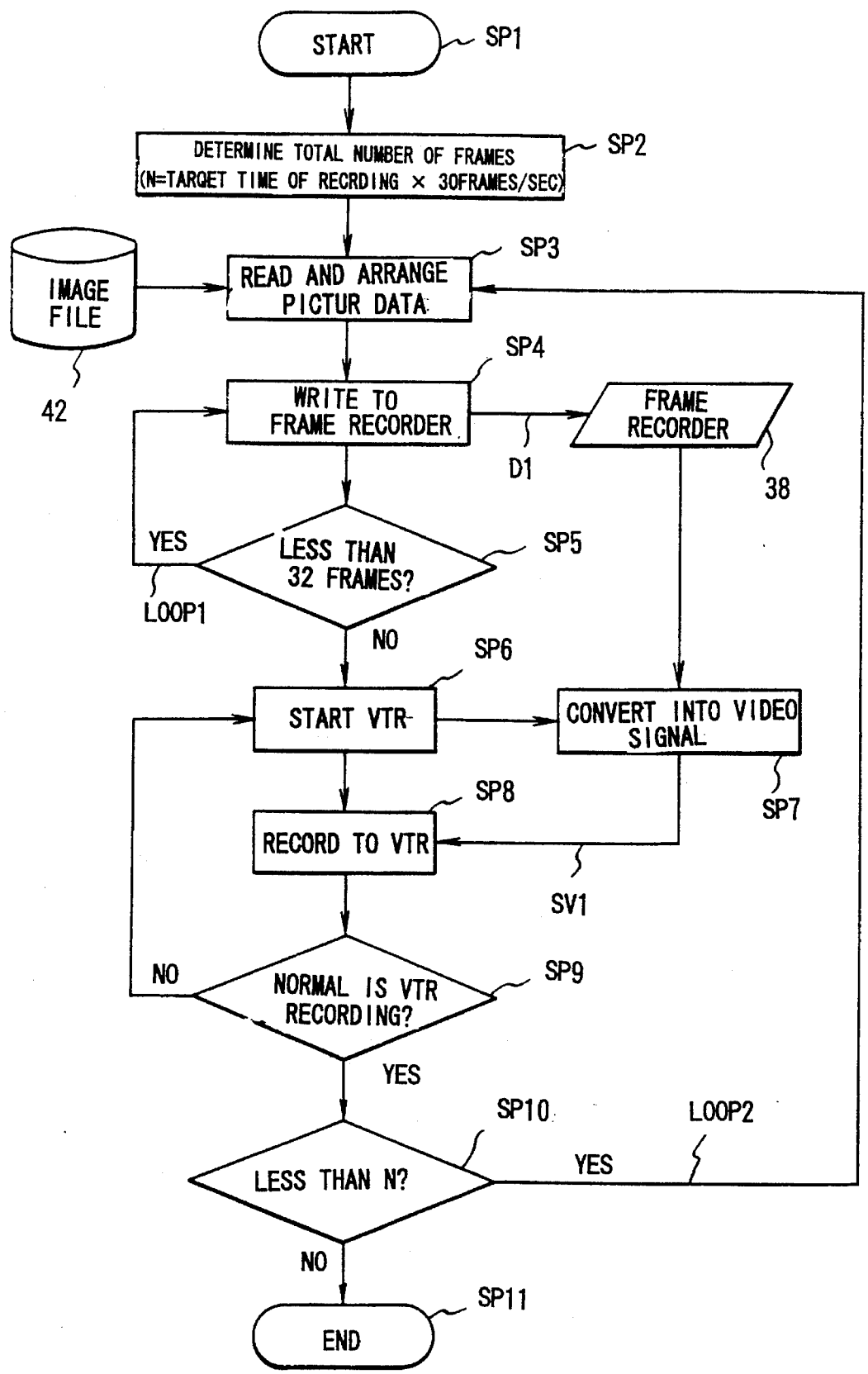
FIG. 4 is a flowchart explaining the operation.

A flow chart of the operation of the animation processing apparatus of the present invention is shown in FIG. 4. At the beginning of operation, the animation producing apparatus 30 proceeds from step SP1 to step SP2, wherein the total number of frames of the whole animation to be generated by the graphic work station 32 is determined.

The operator inputs the recording time and since the number of frames per second is 30 frames, the total frame number can be calculated by the following equation:

$$N = \text{target time of recording} \times 30 \text{ (frames/sec)} \quad (1)$$

After the total number of frames is determined, the animation producing apparatus 30 proceeds to step SP3, wherein picture data read from an image file 42 previously formed (as required) is processed, e.g. by retouch processing, etc., to produce a still picture of one frame.

The animation producing apparatus 30 proceeds to step SP4, at which point the frame recorder 38 is set to begin operating by storing the picture data D1, and in the following step SP5, it is determined whether the number of frames stored in the frame recorder 38 is less than 32 frames.

When an affirmative result is obtained (i.e. less than 30 frames have been stored), the animation producing apparatus 30 repeats step SP4 to form the next still picture, thus a processing loop LOOP1 composed of steps SP4—SP5—SP4 is repeated 32 times to produce and store 32 frames.

After 32 frames of picture data D1 are stored, the animation producing apparatus 30 obtains a negative result in step SP5, and proceeds to step SP6 wherein the video tape recorder (VTR) begins operating (recording, reproducing, etc.).

The frame recorder 38 begins operating in response to the control signal supplied from the video tape recorder 40. Upon proceeding to steps SP7 and SP8, the frame recorder converts the picture data D1 into a video signal SV2 (SP7) and supplies the video signal SV2 to the video tape recorder 40, which records the signal (SP8).

During the recording operation, the animation producing apparatus 30 proceeds to step SP9 to determine whether the video signal was accurately recorded on the basis of the status data (previously described). If a negative result is obtained, the recording operation stops and the process returns to step SP6.

Therefore, in the animation producing apparatus 30, the processing procedures of steps SP6(SP7)—SP8—SP9—SP6(SP7) are repeated, until the video signal is accurately recorded by the video tape recorder 40.

It is to be noted that if the video signal cannot be accurately recorded even after repeating this process 9 times, a discriminating data denoting this is recorded onto the magnetic tape.

Further, the video tape recorder 40 supplies the number of times that recording was attempted to the graphic work station 32, for recording by a predetermined recording means.

The animation producing apparatus 30 thereby contains a file history of this animations producing process, the file history being stored so that it may be referred to as required, for example, when editing is performed.

When an affirmative result is obtained in step SP9 (i.e., the video signal was accurately recorded), the animation producing apparatus 30 proceeds to step SP10 to determine whether the number of frames recorded is less than the total number of frames N, and if an affirmative result is obtained, it returns to step SP3.

Therefore, the animation producing apparatus 30 repeats a processing loop LOOP2 composed of steps SP3—LOOP1 SP6(SP7) SP8— SP9—SP10—SP3 for the total number of frames N. After all of the frames have been recorded, a negative result is obtained in step SP10, and the operation proceeds to step SP11, at which point, the processing procedure is complete.

In the above-described animation producing apparatus 30, the picture data D1 is stored in the frame recorder 38 composed of the predetermined number of frames, and the frame recorder 38 is controlled by the video tape recorder 40 which acts as the master controller. The stored picture data D1 is converted into the video signal SV2 to be recorded by the video tape recorder 40. Therefore, the operator operating the graphic work station 32 can control the entire operation alone, and thus animations can be produced more easily.

More particularly, there is a case that the operator can previously set the conditions of the graphic work station so as to have the still pictures formed automatically. In this case, the entire animation producing apparatus 30 can operate unattended, thus animations can be produced even more easily.

(3) Effects of the Embodiment

With the above described construction, the picture data D1 are stored in the frame recorder 38 which includes a predetermined number of frames, and then the frame recorder 38 is controlled by setting the video tape recorder 40 as the master controller. The stored picture data D1 is then converted into the video signal SV2 which is recorded by the video tape recorder 40. Therefore, the operator operating the graphic work station 32 can control the whole operation alone. Therefore, animations can be produced more easily.

(4) Other Embodiments

In the embodiments described above, the picture data D1 are recorded to the video tape recorder 40 for each of 32 frames, however, this invention is not only limited to this, but may be set to any number of frames.

Further, in the embodiments described above, the video signal is output in the form of color signals. However, this invention is not only limited to this, and it may be widely applied to the case where color difference signals and luminance signals or the like are output.

While there has been described in connection with the preferred embodiments of this invention, it will be obvious to those skilled in the art that various changes and modifications may be made, therefore, to cover in the appended claims all such changes and modifications as fall within the true spirit and scope of the invention.

What is claimed is:

1. An apparatus for producing a video signal representing an animation, said apparatus having a picture data storing mode and a video signal recording mode and comprising:

a graphic work station repeatedly operable in said picture data storing mode for producing respective frames of picture data;

picture data storing means for storing said frames of picture data produced by said graphic work station in said picture data storing mode and for converting the stored frames of picture data into a video signal in said video signal recording mode, said video signal comprising frames of said video signal corresponding to said respective frames of picture data;

a video tape recorder for recording said video signal on a magnetic tape in said video signal recording mode, said video tape recorder determining whether each of said frames of said video signal is properly recorded on said magnetic tape, repeating the recording of those frames of said video signal that are not properly recorded until all of said frames of said video signal are properly recorded, and counting the number of times each of said frames of said video signal is repeatedly recorded; and mode control means for automatically controlling said graphic work station, said picture data storing means and said video tape recorder so as to selectively establish an operation mode of the apparatus, said control means having first and second control means, said first control means being included in said graphic work station for controlling said graphic work station and said picture data storing means and for providing a mode change signal to said second control means for changing said operation mode from said picture data storing mode to said video signal recording mode when said picture data storing means stores a predetermined number of said frames of picture data, said second control means being included in said video tape recorder for controlling said video tape recorder and said picture data storing means to convert the stored frames into said video signal and record said video signal on said magnetic tape, respectively, when said second control means receives said mode change signal from said first control means, said control means returning said operation mode from said video signal recording mode to said picture data storing mode when said video tape recorder records said video signal corresponding to all of said frames of picture data previously stored in said picture data storing means.

2. The apparatus according to claim 1, wherein said second control means controls said video tape recorder and said picture data storing means in accordance with a time code signal previously recorded on said magnetic tape so that video signals are continuously recorded on said magnetic tape.

3. The apparatus according to claim 1, wherein said second control means provides a second mode change signal to said first control means when said video tape recorder records said video signal corresponding to all of said frames of picture data previously stored in said picture data storing means, and said first control means controls said graphic work station and said picture data storing means to produce and store, respectively, said frames of picture data when said first control means receives said second mode change signal from said second control means.

4. The apparatus according to claim 1, wherein said video tape recorder initially records a time code signal on said magnetic tape before recording said video signal on said magnetic tape.

5. The apparatus according to claim 4, further comprising sync generator means for generating synchronizing data and said time code signal; and wherein said video tape recorder, prior to recording said time code signal and video signal, rewinds said magnetic tape by a predetermined distance, reproduces said time code signal previously recorded on said magnetic tape, and then continues to reproduce said magnetic tape until a record starting point is reached, said record starting point being determined in accordance with said reproduced time code signal and said synchronizing data generated by said sync generator means.

6. The apparatus according to claim 1, wherein said graphic work station further includes means for generating and storing a file history containing the respective number of times each of said frames of said video signal is repeatedly recorded.

7. An apparatus for producing a video signal representing an animation, said apparatus having a picture data storing mode and a video signal recording mode and comprising:

picture data storing means selectively controllable for storing frames of picture data in said picture data storing mode and for converting the stored frames of picture data into a video signal in said video signal recording mode, said video signal comprising frames of said video signal corresponding to said respective frames of picture data;

picture data producing means repeatedly operable in said picture data storing mode for producing said respective frames of picture data, for controlling said picture data storing means to store said frames of picture data produced by said picture data producing means, and for automatically changing an operation mode of the apparatus from said picture data storing mode to said video signal recording mode when a predetermined number of said frames of picture data are stored in said picture data storing means; and a video tape recorder which, in said video signal recording mode, controls said picture data storing means for converting all of the stored frames of picture data into said video signal, and for recording said video signal on a magnetic tape, determining whether each of said frames of said video signal is properly recorded on said magnetic tape, repeating the recording of those frames of said video signal that are not properly recorded until all of said frames of said video signal are properly recorded, and counting the number of times each of said frames of said video signal is repeatedly recorded.

8. The apparatus according to claim 7, further comprising means for generating a time code signal; and wherein said video tape recorder, prior to recording said video signal, records said time code signal in a blank frame on said magnetic tape, and then rewinds the magnetic tape by a distance corresponding to said predetermined number of frames of picture data when the operation mode is changed to said video signal recording mode, and said video tape recorder and picture data storing means operate in synchronization with said time code signal.

9. The apparatus according to claim 7, wherein said picture data producing means further includes means for generating and storing a file history containing the respective number of times each of said frames of said video signal is repeatedly recorded.

* * * * *